United States Patent
Bhattacarya

(10) Patent No.: US 6,708,326 B1
(45) Date of Patent: Mar. 16, 2004

(54) METHOD, SYSTEM AND PROGRAM PRODUCT COMPRISING BREAKPOINT HANDLING MECHANISM FOR DEBUGGING AND/OR MONITORING A COMPUTER INSTRUCTION SEQUENCE

(75) Inventor: Suparna Bhattacarya, Karnataka (IN)

(73) Assignee: International Business Machines Corporation, Armonk, NY (US)

(*) Notice: Subject to any disclaimer, the term of this patent is extended or adjusted under 35 U.S.C. 154(b) by 525 days.

(21) Appl. No.: 09/710,164

(22) Filed: Nov. 10, 2000

(51) Int. Cl.[7] ................ G06F 9/44; G06F 11/00; G06F 15/00

(52) U.S. Cl. .............. 717/124; 714/34; 712/227; 717/124

(58) Field of Search ............... 712/227; 714/25, 714/30, 37–39, 34; 717/124–135

(56) References Cited

U.S. PATENT DOCUMENTS

| | | | | |
|---|---|---|---|---|
| 5,239,642 A | * | 8/1993 | Gutierrez et al. | 711/207 |
| 5,452,437 A | * | 9/1995 | Richey et al. | 714/4 |
| 5,740,413 A | * | 4/1998 | Alpert et al. | 712/227 |
| 5,983,017 A | * | 11/1999 | Kemp et al. | 717/129 |
| 5,996,059 A | * | 11/1999 | Porten et al. | 712/200 |
| 6,134,652 A | * | 10/2000 | Warren | 712/227 |
| 6,543,049 B1 | * | 4/2003 | Bates et al. | 717/129 |

OTHER PUBLICATIONS

Huang et al., "ICEBERG: an embedded in–circuit emulator synthesizer for microcontrollers", Proceedings of the 36th ACM/IEEE conference on Design automation conference, Jun. 1999.*

Bedichek, Robert, "Talisman: fast and accurate multicomputer simulation", ACM SIGMETRIC Performance Evaluation Review, Proceeding of 1995 ACM SIGMETRICS joint international conference on Measurement and modeling of computer system, Ma 1995.*

Koch et al., "Breakpoint and breakpoint Detection in Source Level Emulation", ACM Transactions on Design Automation of Electronic Systems, 1996.*

* cited by examiner

Primary Examiner—Wei Zhien
Assistant Examiner—Kuo-Liang J Tang
(74) Attorney, Agent, or Firm—Manny Schecter; T. Rao Coca; Anthony V. S. England

(57) ABSTRACT

A computer method, system and program product for debugging and/or monitoring an instruction set and having an improved breakpoint handling mechanism involving a hardware debug register set (or like breakpoint register means). Instead of patching a break instruction into a debuggee instruction sequence, re-inserting the original instruction and then single stepping through that instruction before replacing it with the patch, the original instruction is left in place and continuous execution is resumed. Before resuming however, the breakpoint register is set so that the break instruction can be re-applied while a flag (eg the Intel RF flag) is set so as to prevent a hardware break before that is desired.

7 Claims, 4 Drawing Sheets

METHOD, SYSTEM AND PROGRAM PRODUCT COMPRISING BREAKPOINT HANDLING MECHANISM FOR DEBUGGING AND/OR MONITORING A COMPUTER INSTRUCTION SEQUENCE

BACKGROUND OF THE INVENTION

1. Field of the Invention

The invention relates to a method, system and program product for debugging and/or monitoring a computer instruction sequence. The term 'program product' here means a body of computer code stored by a machine readable storage medium such as a CD Rom or one or more floppy disks, or made available for downloading from a remote computer site. The computer code may form part of a computer program compiler, or it may be implemented as a debugger which stands alone or which is integrated into or provided as an add-on with another program, for example an editor/assembler or an operating system, or it may form part of one of various instrumentation tools for monitoring or analysing instruction sequences.

A computer or computer based apparatus, eg an industrial automation system, comprises a central processor unit (CPU), often a microprocessor, and random access memory for holding data and instructions for controlling the CPU. A debugging program may be used to cause another program called the "debuggee", generally a relatively low level computer program, eg at the CPU kernel code level, to run on the CPU whilst monitoring the running of the debuggee program. One function of the debugger might be to cause the debuggee program to execute one step at a time (called "single-stepping") or to permit the debuggee program to run continuously until it reaches one or each of more than one breakpoint installed in the debuggee program by the debugger. At the or each breakpoint, or after each single step, the debugger may cause the display of values of parameters such as the contents of particular CPU registers, in order to help the user trace errors ("bugs") in the debuggee program. The means by which the debugger deals with such breakpoints is called herein the "breakpoint handling mechanism".

Note that it is possible to include breakpoints in the actual debuggee program but those breakpoints would need to be removed or made non-functional once the program has been debugged and the program is to be run normally. This invention is concerned with breakpoint handling by the debugger (or other tool or program incorporating a debugger).

2. Related Art

Thus, the basic functionality of breakpointing mechanisms in debuggers or various instrumentation tools is that of causing the generation of notifications/interceptions at desired points in an executing control flow sequence, where the points of interception are specified dynamically at runtime and not pre-programmed.

To assist breakpoint handling, many modern CPU architectures comprise breakpoint registers which can be used to make the processor generate an exception when the address programmed into one of the breakpoint registers is accessed, either for instruction execution or data access depending on the programmed settings. This facility is sometimes used to set breakpoints in code without having to patch the instruction stream explicitly with a breakpoint instruction. In multitasking systems, the operating system usually has support for saving/restoring these registers in the time of a context switch. However, since the number of such registers is usually very limited (eg four in the Intel Pentium platform), these are not sufficient for generic usage where the number of breakpoints required exceeds the number of registers available.

A typical approach, therefore, is to fall back on putting in breakpoint instruction patches once all the breakpoint registers have been used up for a process. In this case, the debugger replaces the instruction in the debuggee's code stream where the breakpoint is desired with a breakpoint instruction. This will cause a trap whenever that instruction is executed. To continue program execution after breakpoint evaluation and processing is done each time the breakpoint is reached, the debugger puts back the original instruction at that point, makes the debuggee single-step this single instruction, and then replaces the breakpoint instruction (so that it is sure to be hit the next time the same code executes) before letting the debuggee continue at full speed.

The above approach which is used in many debuggers today relies on single-stepping to continue execution past a breakpoint. One disadvantage of this approach is that single-stepping can be a little expensive in terms of increasing the debugged program's execution time. That is, the speed at which execution continues past an instruction where a breakpoint has been set. This is because when single step mode is turned on, there is an additional trap and hence switch from the debuggee to debugger on completion of the instruction, where the debuggee puts the breakpoint and then transfers back to the debugger, which would have been stopped till this gets done.

Another related problem is that the method leaves open a window (albeit small) of potential breakpoint misses in the case of multi-threaded debuggee's, especially on multiprocessor systems. This requires some mechanism for stopping all other threads/processors.

Sometimes instruction emulation is used to avoid the need for single-stepping where possible, ie the debugger emulates the instruction instead of running it as a single step on the processor itself. However, this can be done only for a few instructions and has the disadvantage of dependence on knowledge of the instruction set of the processor. Another approach, used in some code patching dynamic instrumentation tools or dynamic debug APIs, is to actually relocate the original instruction to a different location in the debuggee's address space and execute it from there, so that it is not necessary to put the original instruction back in its proper place. This avoids some of the problems cited earlier with in-place execution. However, transparent relocation is not very easy to achieve in all cases, is again dependent on knowledge of the instruction set of the processor, and can have unexpected side-effects in case of dependencies on the actual instruction address values that are hidden with the code/system logic.

SUMMARY OF THE INVENTION

In general terms the invention comprises a method, system and program product for operating a computer processor, which processor is coupled to memory means and which comprises breakpoint register means implemented as hardware in the processor. The invention comprises:

(i) storing, at respective addresses of said memory means, a sequence of processor instructions to be processed by the processor;

(ii) replacing one of said instructions in said sequence with a break instruction;

(iii) supplying said sequence of instructions including the break instruction in place of the said one instruction to said processor;

(iv) when the break instruction has been acted upon by the processor, entering the address of the break instruction in said breakpoint register means;

(v) replacing the said one instruction at its original address; and (vi) causing the processor to resume on-going processing of the remainder of the sequence of instructions from and including said one instruction.

Thus, the breakpoint register means is used for a purpose that is different to the prior art. The restoration of the breakpoint instruction after execution past a breakpoint (after putting back the original instruction) is not done immediately. This enables the omission of the single-step after restoring the original instruction in the sequence described earlier. Instead, at that time, a breakpoint register is used to set an instruction breakpoint at that address, and then a flag (eg the RF flag in Intel) is set in the processor to ensure that the original instruction can execute without faulting right away, and yet cause a fault the next time the same point is hit. The next time the debugger gets control (say, when another breakpoint is hit) in the same process context, the breakpoint instruction can be put back (herein this is called "hardening" of the breakpoint), so that the breakpoint register is free for the next use.

Summarising the prior art method, to continue after processing a breakpoint, the following sequence of actions are carried out:

1. Stop other threads (or stop other processors and disable interrupts, if this is a kernel debugger)
2. Put back original instruction
3. Set the debuggee's program counter to the address of the original instruction
4. Single-step the debuggee (give back control to the debugger after the original instruction is executed)

On completion of single-step (notification via an exception):

5. Turn off single-step
6. Set the breakpoint back again
7. Resume other threads (or resume other processors and enable interrupts back again in the case of kernel debuggers)
8. Continue debuggee By comparison, the method to be described in the following detailed description comprises the following steps:

1. Harden previous breakpoint if any (if it is different from the current one) ["Hardening" involves putting back the breakpoint instruction at the previous breakpoint location]
2. Stop other threads
3. Set up an instruction breakpoint register for the current breakpoint (across processors on a symmetric multi-processor system (SMP) if there were threads in this process running on the other processors—this might involve sending an IPI in the case of kernel debuggers).
4. Resume other threads
5. Put back the original instruction
6. Set the debuggee's PC to the address of the original instruction
7. Set a special processor flag (RF or Resume flag in Intel) in the debuggee's context for suppressing the breakpoint exception for just the next executing instruction [This needs to be done so that the original instruction can get executed as intended without faulting right-away]
8. Continue debuggee Note: If the same point is hit again, then just steps 7 and 8 are enough (assuring that as on Intel, the PC is already set to the faulting instruction's address which would be the same as the original instruction; if not then step 6 might be needed too).

Even a single breakpoint register is sufficient for this optimization to be possible. All that is happening is the delay of setting back the breakpoint instruction as far as possible, thus simplifying the control flow involved in getting the debuggee to run past the breakpoint.

As long as there is an operating system support for making the breakpoint register settings effective across all processors that the concerned process is executing on, this also avoids the window of potential breakpoint misses described earlier. Since internally this still involves stopping other threads while these settings are being changed, this is perhaps not a significant benefit in itself except in cases where the instruction being single-stepped is one that takes a long time to complete (eg if it causes a page fault).

Note that breakpoint execution may be faster as a result of avoiding the single-step. [The gain in speed may be more perceptible in conditional breakpoint evaluation situations, especially if the point happens to be in a loop, even more so in non-interactive debugging/instrumental tools]. The optimisation benefits the most frequently hit breakpoints (ie when the same breakpoint is hit repeatedly in succession without other intervening breakpoints) by its very nature, rather than having the user or even the debugger program trying to decide which breakpoints to set via hardware breakpoint registers to improve performance.

The performance benefits of making more debug registers available would be distributed more effectively across all breakpoints if the above steps are extended to use up all available breakpoint registers before attempt to reuse the register.

Not having to single-step may also simplify the management of breakpoint state information in some cases. For example, with the single-step based approach, global state may be required for tracking the currently executing breakpoint across the execution of the original instruction, especially in the case of kernel debuggers, where interrupts may have to be disabled right through the single-step to avoid nested execution complexities. In embodiments of the invention described herein, the main global state to be maintained is for remembering the last non-hardened breakpoint register at any point, while the breakpoint is hardened only before the next time there is a need for the breakpoint register. Problems may arise with kernel breakpoints in pageable kernel code if the next breakpoint occurs in an interrupt handler or some place where page faults cannot be taken. To overcome this the hardening of the earlier breakpoint could be safely delayed a little, say, if it is possible to come in the way of the page fault handling code to make sure that the breakpoint is hardened before the page can actually be accessed next.

Note that the method described herein relies on architectures that have debug/breakpoint registers. In addition, for an architecture where the breakpoint fault happens before the execution of the specified instruction, there should be some hardware support for a mechanism to delay the effect of the breakpoint register settings to immediately after the instruction that caused that just trapped (ie a provision for explicitly setting something like an RF flag in Intel or the PSW Z bit in HP PA-Risc).

DETAILED DESCRIPTION

Figure 1:
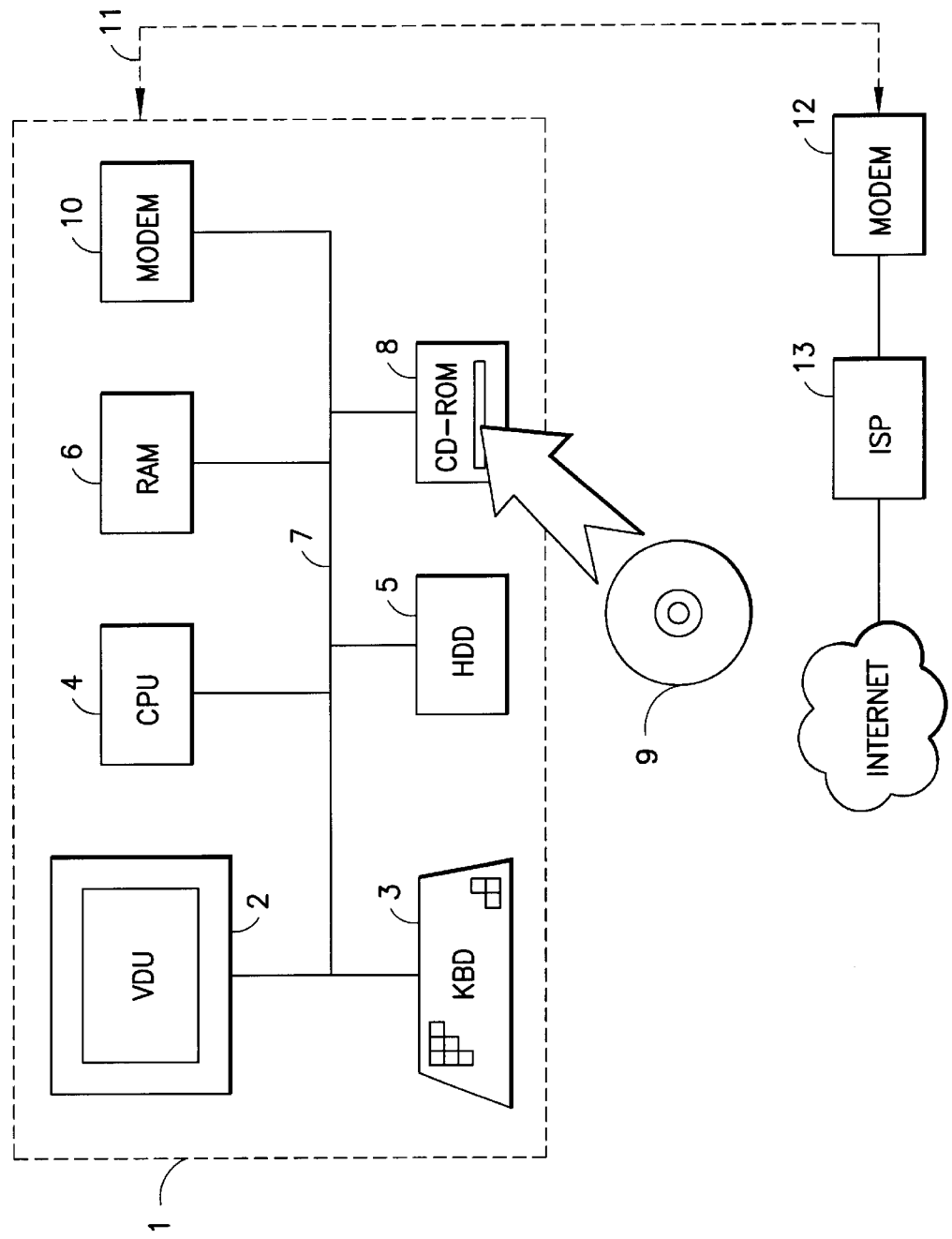
FIG. 1 is a simplified diagram of a computer system.

FIG. 1 shows one embodiment of a computing environment in which the present invention may be implemented.

This embodiment comprises a so-called stand alone computer 1, ie one which is not permanently linked to a network, including a display monitor 2, a keyboard 3, a microprocessor—based central processing unit 4, for example an Intel Pentium processor, a hard-disc drive 5 and a random access memory 6 all coupled one to another by a connection bus 7. The keyboard 3 is operable for enabling the user to enter commands into the computer along with user data such as a search query. As well as keyboard 3, the computer may comprise a mouse or tracker ball (not shown) for entering user commands especially if the computer is controlled by an operating system with a graphic user interface.

To introduce program instructions into the computer 1, ie to load them into the memory 6 and/or store them onto the disc drive 5 so that the computer begins to operate, and/or is made able to operate when commanded, in accordance with the present invention the computer 1 comprises a CD-ROM drive 8 for receiving a CD-ROM 9.

In addition to the CD-ROM drive 8, or instead of it, any other suitable input means could be provided, for example a floppy-disc drive or a tape drive or a wireless communication device, such as an infrared receiver (none of these devices being shown).

Finally, the computer 1 also comprises a telephone modem 10 through which the computer is able temporarily to link up to the Internet via telephone line 11, a modem 12 located at the premises of an Internet service provider (ISP), and the ISP's computer 13.

The following describes how an embodiment of the invention can be implemented on the Intel Pentium platform.

Hardware Debugging Feature

Figure 2:
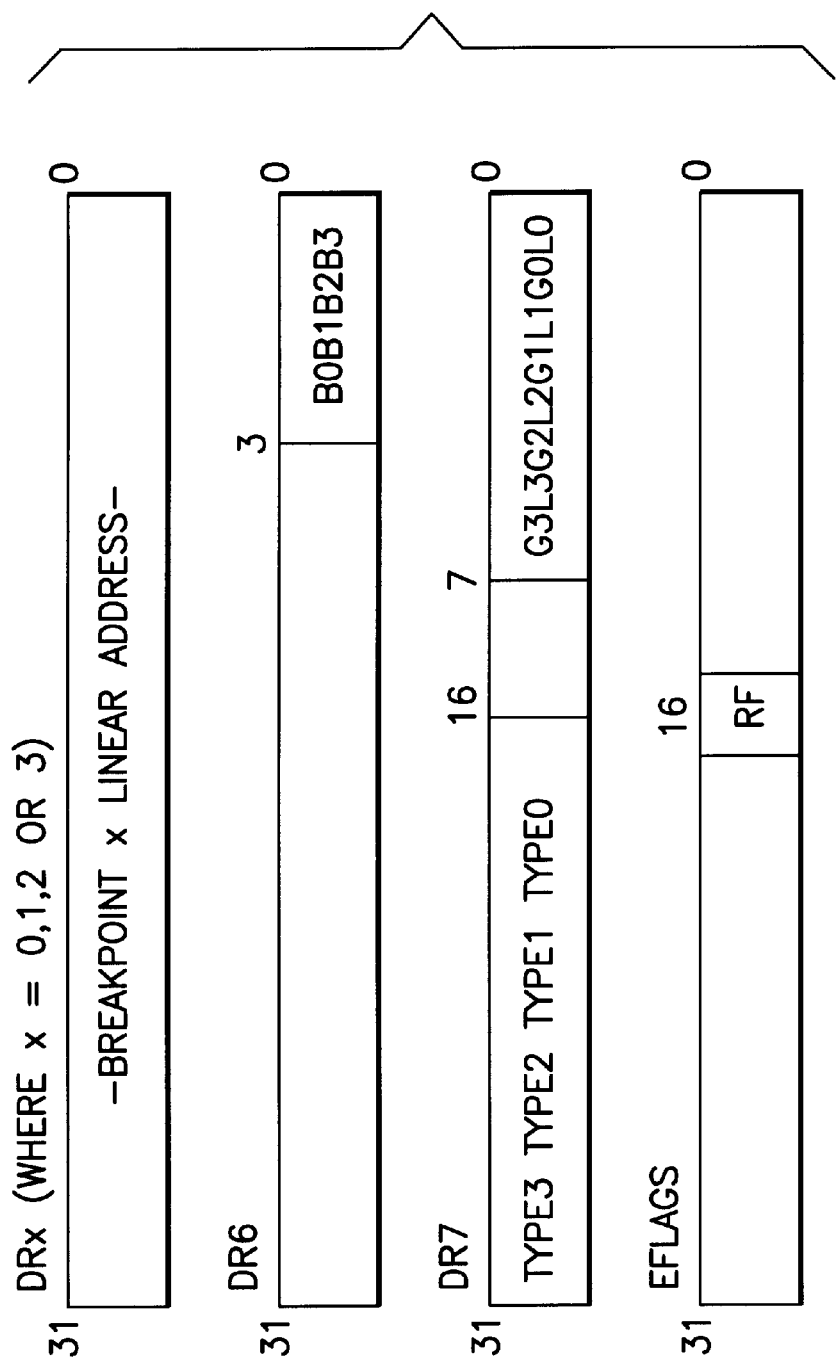
FIG. 2 is a diagram for showing the contents of hardware registers of a CPU of the FIG. 1 system.

The Intel Pentium processor provides the following hardware debugging features (refer FIG. 2):

A breakpoint instruction WT3): When this instruction is executed, the processor generates a breakpoint trap exception (Interrupt 3). When the trap happens, the saved instruction pointer (EIP register) points to the instruction following the breakpoint instruction.

Single stepping mode: When the TF bit (trap flag) in the processor's EFLAGS register is set, then the processor generates an exception (Interrupt 1) after the execution of every instruction.

Debug registers: A set of registers (DRO-DR7) are used for specifying hardware breakpoints. These include 4 debug address registers (DRO-DR3), each of which can be programmed with a memory (or I/O) location address signifying an instruction or data breakpoint. The processor generates an exception when a memory I/O operation takes place on one of these addresses. Each of the 4 registers can configured for either an instruction or a data breakpoint. For instruction breakpoints, the exception is generated just before the execution of the instruction at the specified location. When the exception happens, the save instruction pointer (EIP register) points to the breakpoint instruction, which was about to execute.

The debug control register (DR7) settings can be used to specify the type of the breakpoint (none, instruction, data reads, data reads/writes) for each of the 4 registers.

When a debug exception happens, the debug status register (DR6) indicates the conditions which caused the exception. The remaining debug registers, DR4 and DR5 are reserved.

Resume flag for breakpoint fault suppression: When the RF bit (resume flag) in the processor's EFLAGS register is set, then hardware breakpoint faults are suppressed for the next instruction. This enables the debug exception handler to resume program execution from the breakpointed instruction without having it generate a breakpoint fault again on the same instruction. The RF flag is set by the IRETD instruction to the value specified by the saved copy of the EFLAGS register (which the exception handler should have modified to the desired value) in order to disable the generation of the instruction breakpoint exception on the instruction immediately following the IRETD. The processor clears the RF flag at the successful completion of every instruction (except for the IRET instruction, and instructions resulting in a task-switch). This means that the breakpoint settings are activated back again right after the breakpointed instruction is executed.

Steps Proposed

The following explains how the above features could be used in implementing the suggested approach in a user mode debugger on this platform:

It is assumed, for ease of explanation, that the debug address register DR3 is available for this purpose (we could reserve any debug register and use it instead).

Figure 3:
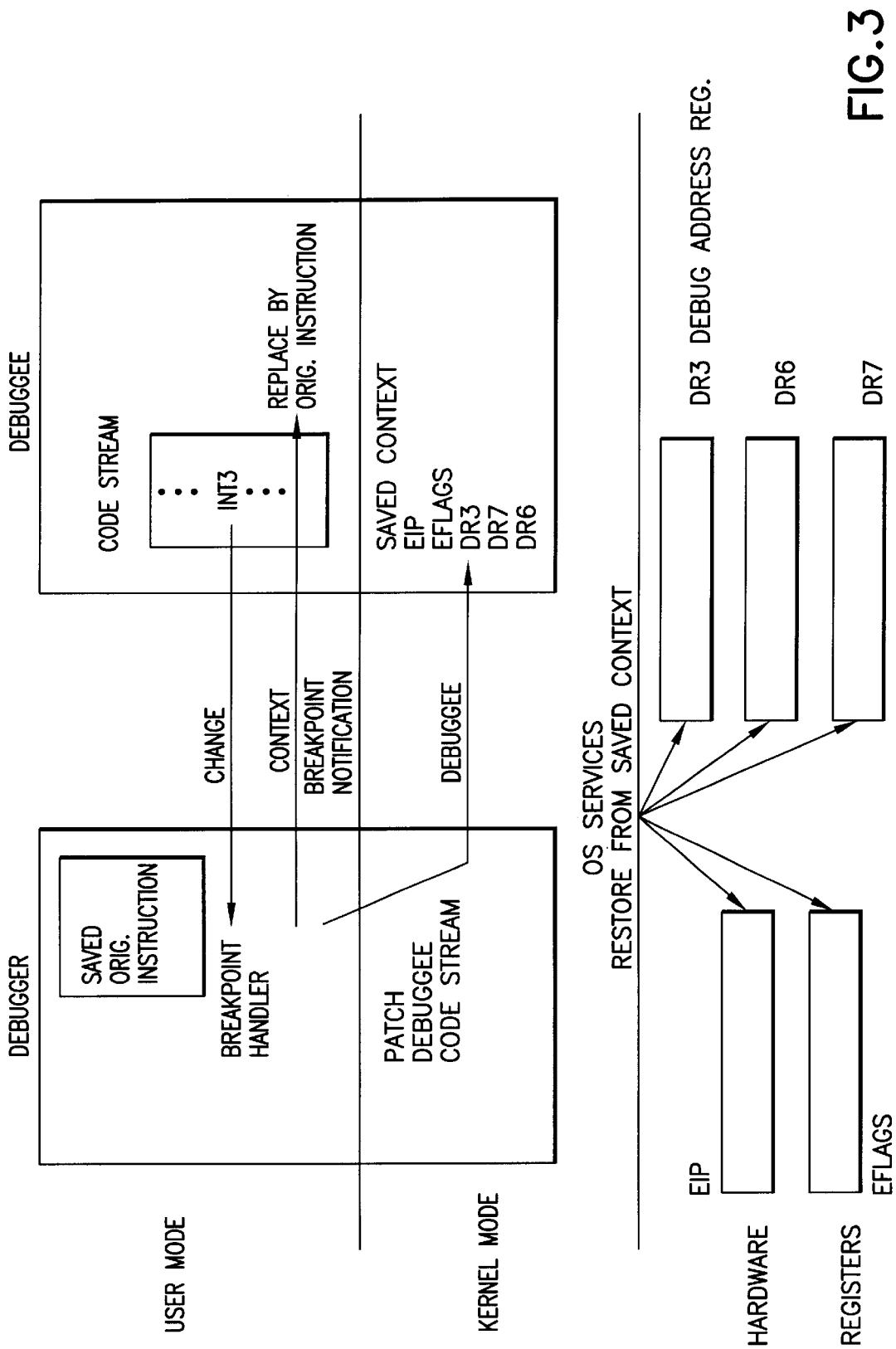
FIG. 3 is a simplified diagram illustrating the interaction between hardware levels.

Refer to FIG. 3 for an illustrative representation of the system. It is the operating system that directly deals with the hardware registers, loading them from the process context information saved. The debugger makes use of operating system services to manipulate the debuggee's process context and code stream.

1. Setting a Breakpoint

A breakpoint is set at a specified location by replacing the instruction at that address with a breakpoint instruction (INT 3) and saving the original instruction. This is the same as the way it is typically done in existing debuggers.

2. When a Breakpoint Exception Takes Place:

The following are the steps to be followed:

(a) Complete desired breakpoint handling (depends on required debugger logic). For conditional breakpoints this could just be a check for the condition.

Figure 4:
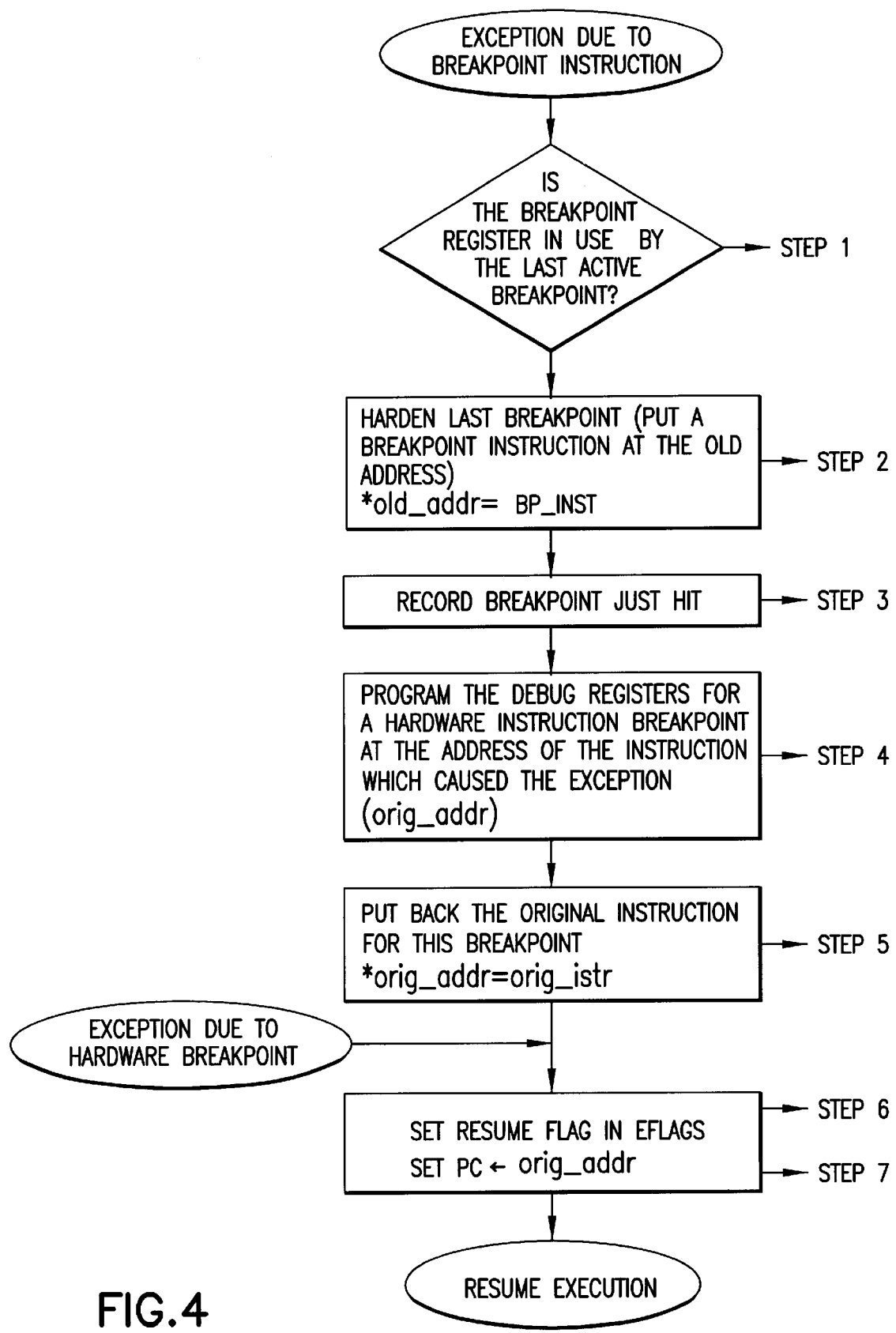
FIG. 4 shows a flowchart for a breakpoint handling mechanism.

(b) Now, to continue execution after the desired processing is complete and referring to the flow chart of FIG. 4 where the step numbers refer to the step numbers given below:

If this is a trap due to the execution of a breakpoint instruction (Interrupt 3), then: start from step 1.

If this is due to a hardware instruction breakpoint fault (Interrupt 1), then start from step 7.

Step 1 Is the breakpoint register in use, ie is there an earlier breakpoint to harden in this process context? If yes, then continue to step 2, else go to step 3.

Step 2 Harden the last breakpoint by replacing the instruction at the old address (as set in DR3, or saved as part of last active breakpoint information) with a breakpoint instruction (INT3).

Step 3 Record the breakpoint just hit as the last active breakpoint.

Step 4 Set up an instruction breakpoint register in the debuggee's context for the current breakpoint by setting DR7 to enable instruction breakpointing via DR3, and loading the instruction's address into DR3. (This should be done in way that takes effect for processors which could be running threads from this process in case of an SMP system.)

Step 5 Put back the original instruction for the breakpoint location (which was saved earlier).

Step 6 Set the debuggee's EIP to the address of the original instruction (by making changes to saved EIP register context for the thread).

Step 7 Set the RF flag in the saved EFLAGS context for the thread to suppress the breakpoint exception for the instruction that executes just after the context is restored.

Step 8 Let the debuggee resume execution.

To do this, the other threads might need to be stopped and resumed so that the corresponding processor registers get refreshed with the changes to the debug register context settings for the process. It is excepted that the operating system saves/restores debug register context across process context switches. If this happens at a thread level, then the debug register context changes for setting the new instruction breakpoint will have to be effected on all the thread contexts for that process.

It is possible for a context switch to happen just before execution continues past a breakpoint and then a different breakpoint gets hit in another process context, requiring hardening of the earlier breakpoint. In this situation, context switches to the original point, executing the breakpoint instruction and thus enters the breakpoint handler again. However, since the debug register settings will still to present, it is possible to distinguish this situation from a genuine breakpoint and simply ignore it.

The above example is in the context of a user level debugger. The same approach could be applied to a kernel debugger too, its only that in this case it is the kernel context itself and processor registers that are directly modified, and that an IPI (Inter-processor interrupt) may be required to effect changes in the debug registers on all the processors. Another requirement in that case is that at least one debug register should remain set across all process contexts and not be reloaded during a context switch.

Whilst a particular preferred embodiment of the invention has been shown and described herein by way of example, it will be understood by persons skilled in the art that modification, developments and other changes in form and detail may be made without departing from the spirit and scope of the invention as defined in the appended claims and equivalents thereof.

The focus of the invention is usage of the breakpoint register to avoid the overhead of having to single-step, the "hardening" of the previous breakpoint to deal with the problem of limited breakpoint registers and also ensuring optimization for breakpoints that get hit repeatedly in sequence. It is not absolutely necessary to stop all the other threads at the same time. It will usually be necessary to ensure that the debug register settings are effected in all other thread contexts before proceeding to the next step.

I claim:

1. A method for operating a computer processor, which processor is coupled to memory and comprises breakpoint register means implemented as hardware in the processor, such breakpoint register means including a breakpoint register for holding an address and means for causing an exception in response to the processor accessing an address in the memory corresponding to the address stored in the breakpoint register, the method comprising the steps of:
    (i) storing at respective addresses of said memory a sequence of processor instructions to be processed by the processor;
    (ii) replacing one of said processor instructions in said sequence with a break instruction, wherein in step (i) the one of said processor instructions was stored in a certain one of the addresses, and wherein, the replacing includes storing the break instruction in the memory at the certain address in place of said one processor instruction;
    (iii) supplying said sequence of processor instructions, including the break instruction in place of the said one processor instruction, to said processor;
    (iv) when the break instruction has been acted upon by the processor, entering the certain address in said breakpoint register;
    (v) re-inserting the one of said processor instructions in the memory at the certain address; and
    (vi) causing the processor to resume on-going processing of a remainder of the sequence of processor instructions from and including said one processor instruction.

2. A method according to claim 1, including, between steps (v) and (vi) of the method, the steps of:
    (vii) setting a program counter of the processor to the address of said one processor instruction; and
    (viii) setting a flag of the processor for causing an effect of the entry in the breakpoint register means to be suppressed whilst said one processor instruction is processed by the processor.

3. A method according to claim 1, wherein the method is carried out in conjunction with controlling the processor using an operating system comprising a kernel or nucleus that handles multiple instruction threads and the method further comprises the steps of:
    (ix) before step (iv), ensuring that all instruction threads being handled by the kernel or nucleus at that time are stopped from being processed by the processor; and
    (x) between steps (iv) and (v), causing the processor to resume the processing of said instruction threads.

4. A computer system comprising memory and a central processor unit that includes a hardware implemented breakpoint register means, such breakpoint register means including a breakpoint register for holding an address and means for causing an exception in response to the processor accessing an address in the memory corresponding to the address stored in the breakpoint register, the system comprising an operating program stored by the memory and operable for controlling the computer system and also comprising a program including a breakpoint handling mechanism and operable for one of debugging, monitoring, analysing and tracing a debuggee program to be debugged, monitored, analyzed or in which program errors are to be traced, the debuggee program including a sequence of debuggee program instructions stored at respective addresses of said memory, the breakpoint handling mechanism comprising:
    (a) replacing means for replacing one of the instructions in the debuggee program with a break instruction, wherein the one of the debuggee instructions was stored in a certain one of the addresses and the replacing includes storing the break instruction in the memory at the certain address in place of the one debuggee instruction;
    (b) means for causing the debuggee program to run until the break instruction is reached;

(c) means for entering the certain address in said breakpoint register when the break instruction has been acted upon by the processor;

(d) means for re-inserting the one of said debugee instructions in the memory at the certain address; and (e) means for causing the processor to resume on-going processing of a remainder of a the debuggee program from and including said one debugee instruction.

5. A system according to claim 4, wherein said means for causing the processor to resume on-going processing of the remainder of the debuggee program includes means for setting said program counter to the address of said one debugee instruction and means for setting a flag of the processor for causing the effect of the entry in the breakpoint register means to be suppressed, whilst said one debugee instruction is processed by the processor.

6. A system according to claim 5, wherein said operating program comprises a kernel or nucleus for handling multiple instruction threads forming concurrent user processes at the level of an operating program shell, and wherein said means for causing the debuggee program to run until the break instruction is reached includes means for ensuring that all instruction treads being handled by the kernel or nucleus are stopped, the system further including means for ensuring resumption of said multiple instruction threads before the said one debugee instruction is re-inserted by the re-inserting means.

7. A computer program product having a computer readable medium with a computer program recorded thereon for operating a computer processor, which processor is coupled to memory and comprises a breakpoint register means, such breakpoint register means including a breakpoint register for holding an address and means for causing an exception in response to the processor accessing an address in the memory corresponding to the address stored in the breakpoint register, said computer program comprising:

(i) computer program code means for storing at respective addresses of said memory a sequence of processor instructions to be processed by the processor;

(ii) computer program code means for replacing one of said processor instructions in said sequence with a break instruction, wherein the computer program code means in (i) is operable to store the one of said processor instructions in a certain one of the addresses, and wherein the replacing includes storing the break instructions in the memory at the certain address in place of said one processor instruction;

(iii) computer program code means for supplying said sequence of processor instructions including the break instruction in place of the said one processor instruction, to said processor;

(iv) computer program code means for entering the certain address in said breakpoint register when the break instruction has been acted upon by the processor;

(v) computer program code means for re-inserting the one of said processor instructions in the memory at the certain address; and (vi) computer program code means for causing the processor to resume on-going processing of a remainder of the sequence of processor instructions from and including said one processor instruction.

* * * * *